(12) United States Patent
Marconi

(10) Patent No.: US 7,946,219 B2
(45) Date of Patent: May 24, 2011

(54) APPARATUS FOR MAKING A STEAMED-MILK DRINK

(75) Inventor: Gian Carlo Marconi, Silea (IT)

(73) Assignee: De'Longhi S.p.A., Treviso (IT)

( * ) Notice: Subject to any disclaimer, the term of this patent is extended or adjusted under 35 U.S.C. 154(b) by 999 days.

(21) Appl. No.: 11/578,979

(22) PCT Filed: Apr. 8, 2005

(86) PCT No.: PCT/EP2005/003731
§ 371 (c)(1),
(2), (4) Date: Oct. 18, 2006

(87) PCT Pub. No.: WO2005/102126
PCT Pub. Date: Nov. 3, 2005

(65) Prior Publication Data
US 2007/0243305 A1    Oct. 18, 2007

(30) Foreign Application Priority Data
Apr. 21, 2004  (IT) .............................. MI2004A0777

(51) Int. Cl.
A23F 3/00  (2006.01)
A23L 2/54  (2006.01)
B01F 3/04  (2006.01)
A47J 31/44  (2006.01)
A47J 31/00  (2006.01)

(52) U.S. Cl. .................... 99/323.1; 99/293; 99/302 R

(58) Field of Classification Search ................ 99/323.1, 99/293, 279, 290, 295, 300, 302 R, 452; 426/433, 426/596; 261/DIG. 16, DIG. 76
See application file for complete search history.

(56) References Cited

U.S. PATENT DOCUMENTS

| 4,922,810 A | * | 5/1990 | Siccardi ...................... 99/323.1 |
| 5,265,520 A | * | 11/1993 | Giuliano ...................... 99/323.1 |
| 5,473,972 A | * | 12/1995 | Rizzuto et al. .................. 99/290 |
| 5,490,447 A | * | 2/1996 | Giuliano ......................... 99/286 |
| 5,498,757 A | * | 3/1996 | Johnson et al. ............... 426/520 |
| 5,549,036 A | * | 8/1996 | Hourizadeh .................... 99/286 |
| 5,611,262 A | * | 3/1997 | Rizzuto et al. .................. 99/294 |
| 5,628,239 A | * | 5/1997 | Wu ................................. 99/290 |
| 5,738,002 A | * | 4/1998 | Marano-Ducarne ........... 99/293 |
| 5,862,740 A | * | 1/1999 | Grossi ............................ 99/293 |
| 5,884,552 A | * | 3/1999 | Lussi et al. ................... 99/323.1 |

(Continued)

FOREIGN PATENT DOCUMENTS
EP    1374748    1/2004

*Primary Examiner* — Reginald L. Alexander
*Assistant Examiner* — Hemant Mathew
(74) *Attorney, Agent, or Firm* — Andrew Wilford

(57) ABSTRACT

A coffee machine has a housing, a dispenser head on the housing for pouring brewed coffee into a cup below the dispenser head, a horizontally open steam/hot-water dispenser fixed on the housing adjacent the dispenser head, and a container adapted to hold a supply of milk and having a cover. A connection conduit opening into a chamber on the cover and can fit with the steam/hot-water dispenser to receive steam or hot water therefrom. An air-suction conduit opens into the chamber, and a milk-suction conduit extends from the chamber down into the milk in the container. A discharge conduit carried on the container and opening into the chamber can shift into a working position directed into the zone to feed a mixture of steam or hot water and air and/or milk into the cup below the dispenser head.

11 Claims, 17 Drawing Sheets

U.S. PATENT DOCUMENTS

| | | | |
|---|---|---|---|
| 5,931,080 A * | 8/1999 | Roure Boada | 99/293 |
| 6,192,785 B1 * | 2/2001 | Trida et al. | 99/284 |
| 6,412,394 B2 * | 7/2002 | Bonanno | 99/299 |
| 6,499,389 B1 * | 12/2002 | Probst | 99/323.1 |
| 6,681,685 B2 * | 1/2004 | Mahlich | 99/453 |
| 7,069,843 B2 * | 7/2006 | Paoletti | 99/453 |

* cited by examiner

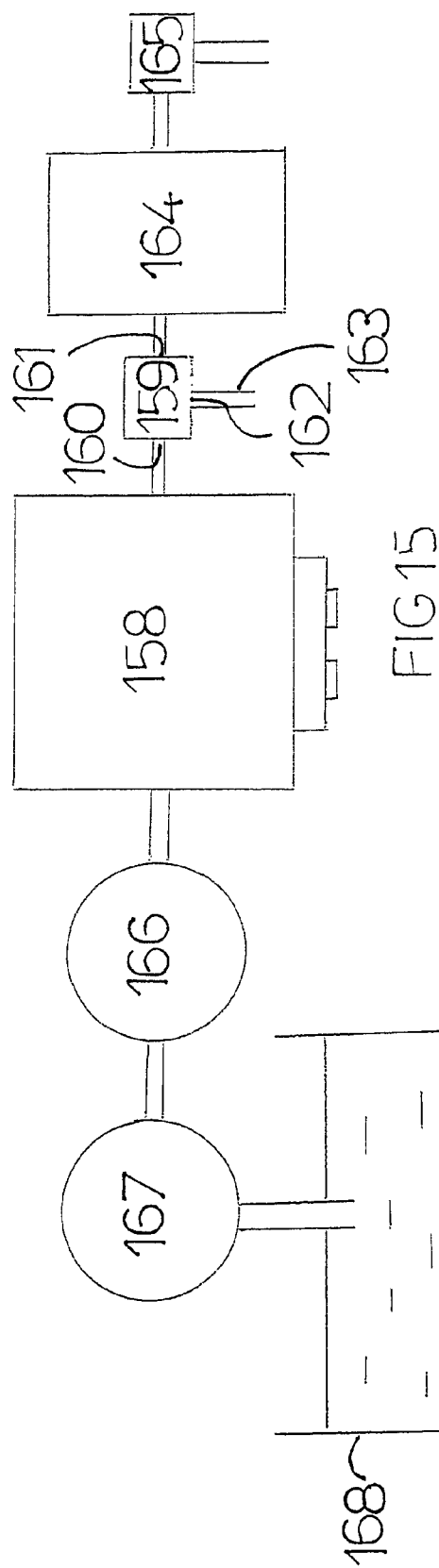
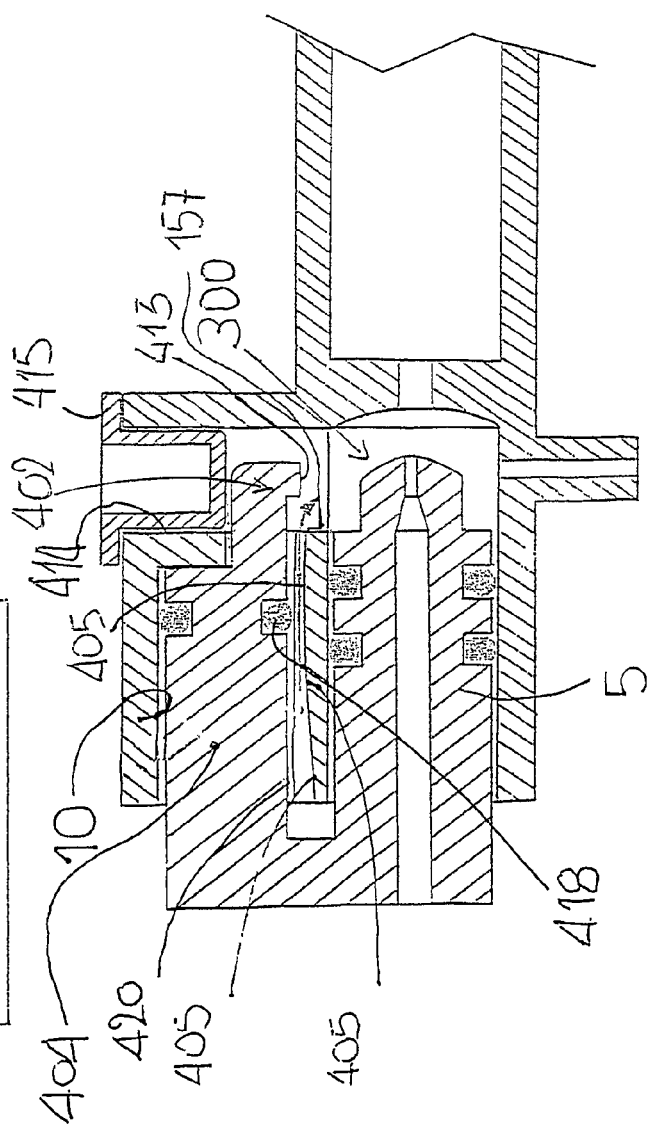
FIG 14
FIG 15

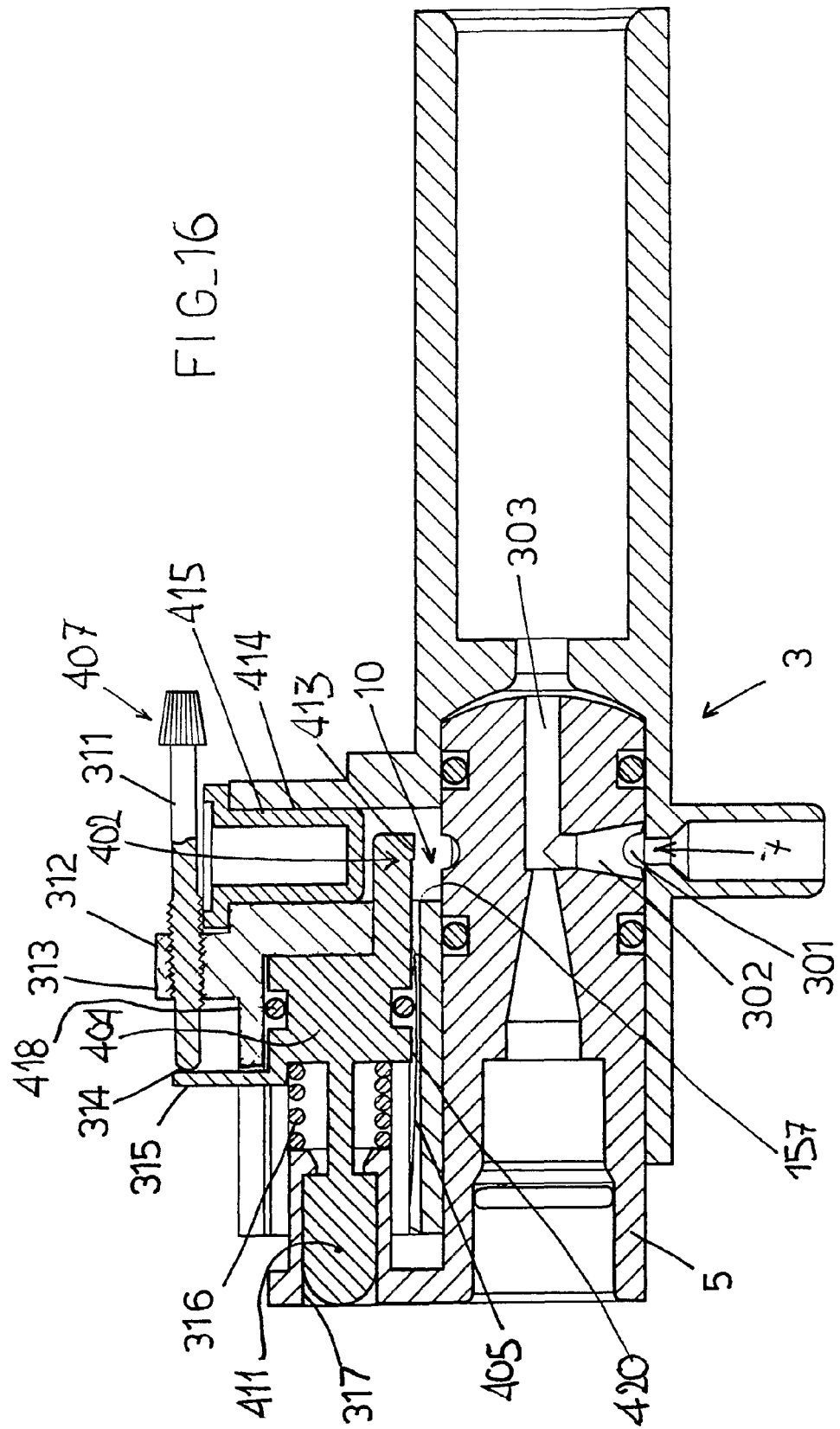
FIG_16

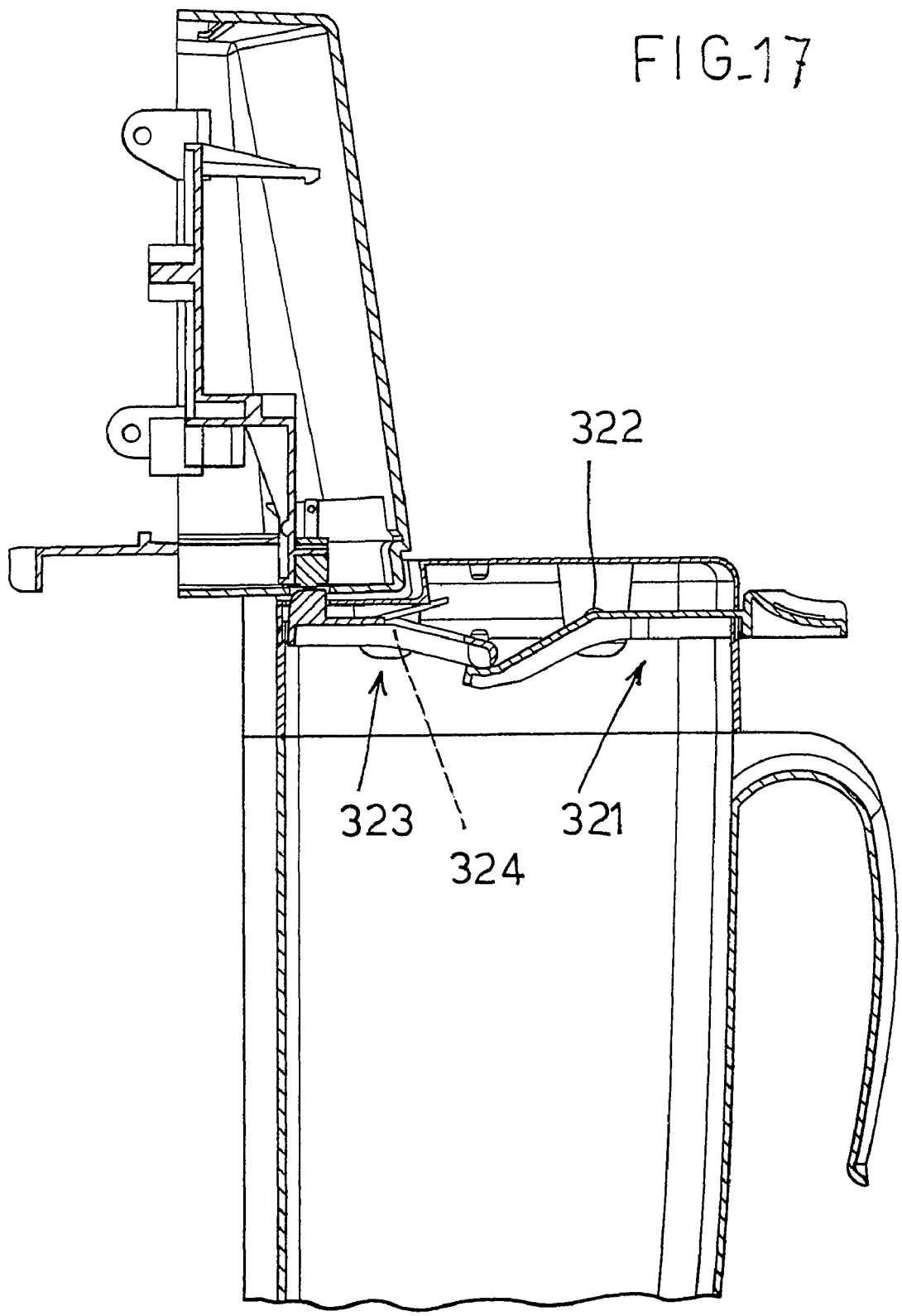
FIG_17

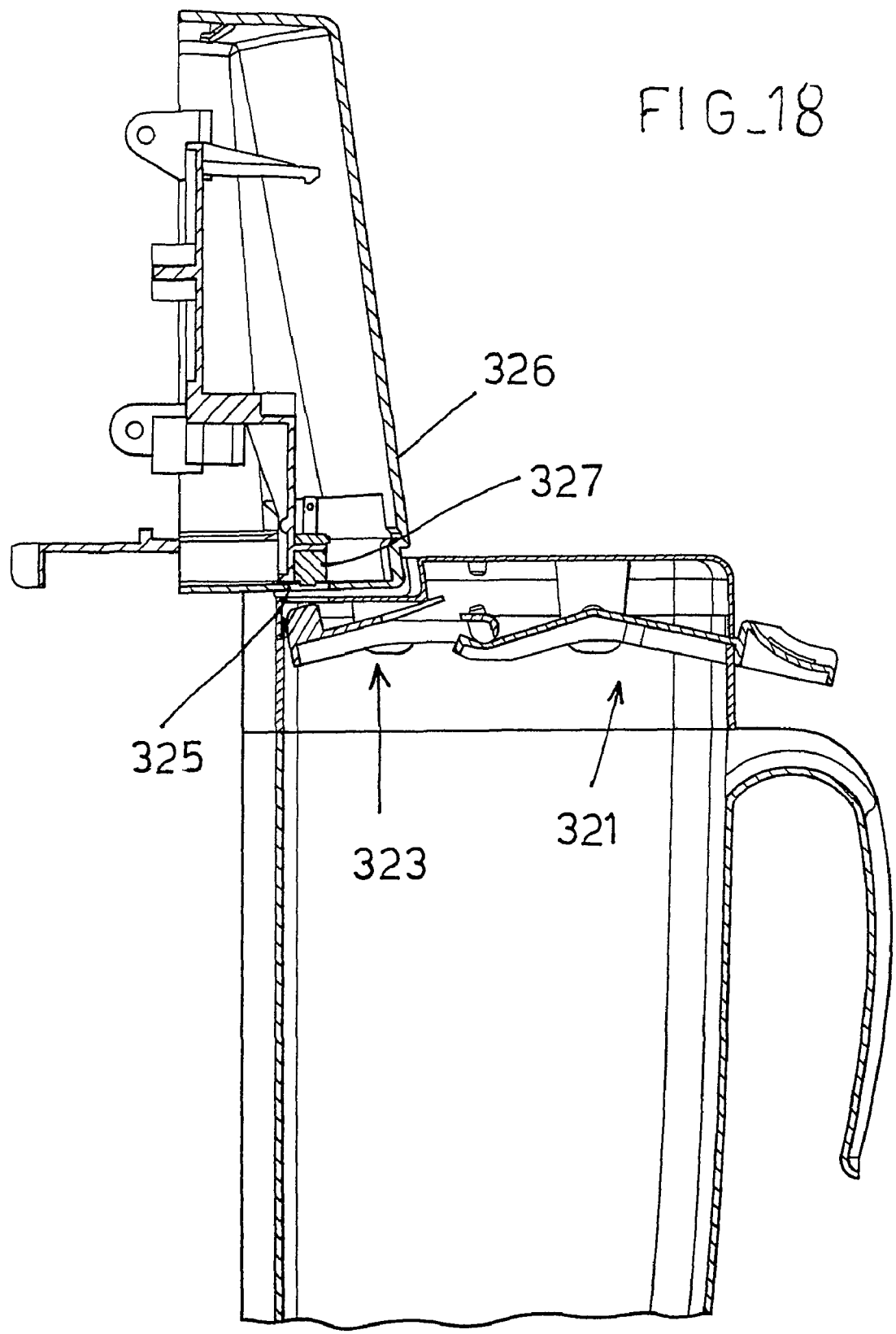
FIG_18

APPARATUS FOR MAKING A STEAMED-MILK DRINK

CROSS REFERENCE TO RELATED APPLICATIONS

This application is the US national phase of PCT application PCT/EP2005/003731, filed 8 Apr. 2005, published 3 Nov. 2005 as WO2005/102126, and claiming the priority of Italian patent application MI2004A000777 itself filed 21 Apr. 2004, whose entire disclosures are herewith incorporated by reference.

FIELD OF THE INVENTION

The present invention refers to a device for producing a steamed-milk drink, in particular to a cappuccino, but more generally also to a coffee and milk drink without froth, or furthermore to a drink of just hot milk with or without froth.

BACKGROUND OF THE INVENTION

It is known that in apparatuses for use in the home for preparing coffee or cappuccino there is a steam dispenser suitable for mixing the milk taken from a container with air to obtain a final emulsion of milk, air and steam that gives the drink the quantity of froth with the desired characteristics.

Such apparatuses suffer from some drawbacks, the greatest of which are those due to the awkwardness and poor versatility of use and to the difficulty of access to the inner parts for inspection.

Such apparatuses also do not have a system for cleaning the inner parts or have one that is not very effective so as to gradually bring about a deterioration of performance.

Moreover, the quality of the emulsion can often be degraded by the configuration and/or structural and/or functional characteristics of such conventional apparatuses. For example, the influence that the mixing operation of the milk with the air and the steam addition operation have upon each other, due to the fact that they are carried out in the same area, can have a negative influence upon the quality of the emulsion.

OBJECTS OF THE INVENTION

The object of the present invention is, therefore, making a device for producing a steamed-milk drink that allows the aforementioned technical drawbacks of the prior art to be eliminated.

In this technical task an object of the invention is making a device for producing a steamed-milk drink that is versatile and extremely easy to use.

A further object of the present invention is providing a device for producing a steamed-milk drink that is easy to inspect and accessible in all of its parts.

Another object of the invention is providing a device for producing a steamed-milk drink that has a system for cleaning the inner parts that is extremely effective so as to keep a high standard of performance.

Another object of the present invention is providing an effective device for producing a steamed-milk drink such as to ensure that the drink always has the desired characteristics.

The last but not least object of the present invention is providing a process for producing a cappuccino suitable for automatically carrying out both the brewing of coffee and the frothing of milk with a single command.

SUMMARY OF THE INVENTION

These, as well as other objects, according to the present invention, are attained by making a device for producing a steamed-milk drink, characterized in that it comprises a steam or water dispenser and a container for the milk that is connected, directly or indirectly, to a collector body that defines an inner chamber into which a connection conduit to the dispenser, a milk suction conduit in the container and an air suction conduit open, the container being removably associated with the dispenser so as to be able to be separated from it for conservation of the milk present in the container.

The present invention also discloses a process for producing a cappuccino, characterized in that with a single command of a coffee machine it involves automatically carrying out the brewing of coffee into a cup, the withdrawal of a predetermined amount of milk contained in a milk container through the action of a steam flow sent by the steam dispenser of the coffee machine through a collector body connected directly or indirectly to the milk container, the frothing of the predetermined amount of milk through injection of air to the collector body, the interruption of the flow of steam when the predetermined amount of milk has been withdrawn, and the conveying of the predetermined amount of frothed milk into the cup.

Advantageously, therefore, such a process allows an amount of brewed coffee and milk frothed with steam to be produced with a single command of the machine.

Other characteristics of the present invention are defined, moreover, in the following claims.

BRIEF DESCRIPTION OF THE DRAWING

Further characteristics and advantages of the invention shall become clearer from the description of a preferred but not exclusive embodiment of the device for producing a steamed-milk drink according to the invention, illustrated for indicating and not limiting purposes in the attached drawings, in which:

FIG. 14 is a sectional view of a different preferred embodiment of a system for cleaning the air inlet to the collector body of a device according to the present invention;

FIG. 15 is a schematic diagram of the water/steam circuit of a device according to the present invention;

FIG. 16 is a sectional view of a further preferred embodiment of a system for cleaning the air inlet of the collector body and for adjusting the flow of air through it; and FIGS. 17 and 18 show a locking system of the connection between the collector body and the dispenser in the two operating positions.

SPECIFIC DESCRIPTION

Figure 1:
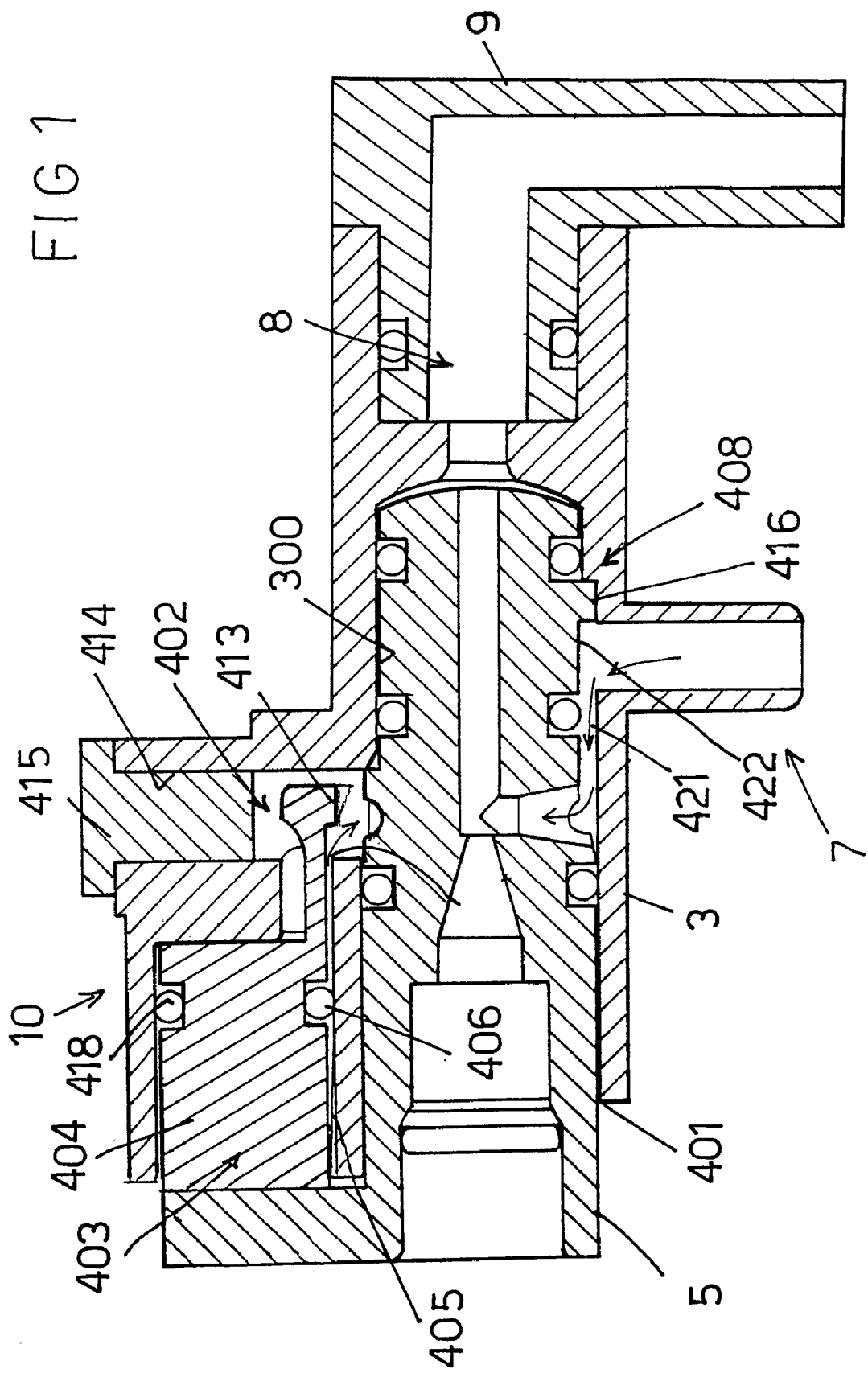
FIG. 1 is an enlarged axial sectional view of the steam/hot-water dispenser—collector body assembly of the device for producing a steamed-milk drink of the present invention, in which the first scraper of the air suction conduit and the second scraper of the milk suction conduit are shown.

Equivalent parts of the different embodiments of the device in the following description are identified by the same reference numeral.

With reference to the figures, a device for producing a steamed-milk drink is shown, generally indicated with reference numeral 1. The device 1 comprises a steam or hot-water dispenser 5 and a container 2 for the milk that is directly or indirectly connected to a collector body 3 removably associated with the dispenser 5.

The collector body 3 internally defines a chamber 300 into which a connection conduit 401 to the dispenser 5, a suction conduit 7 of the milk in the container 2 and an air suction conduit 10 open.

The collector body 3 can be carried by a cover 26 of the container 2, and in particular, as illustrated, can be formed integrally with it.

Preferably, the collector body 3 extends in a position outside and at the top of a first side wall 14 of the container 2.

The steam or hot-water dispenser 5 is, for example, part of a coffee machine 6.

Figure 5:
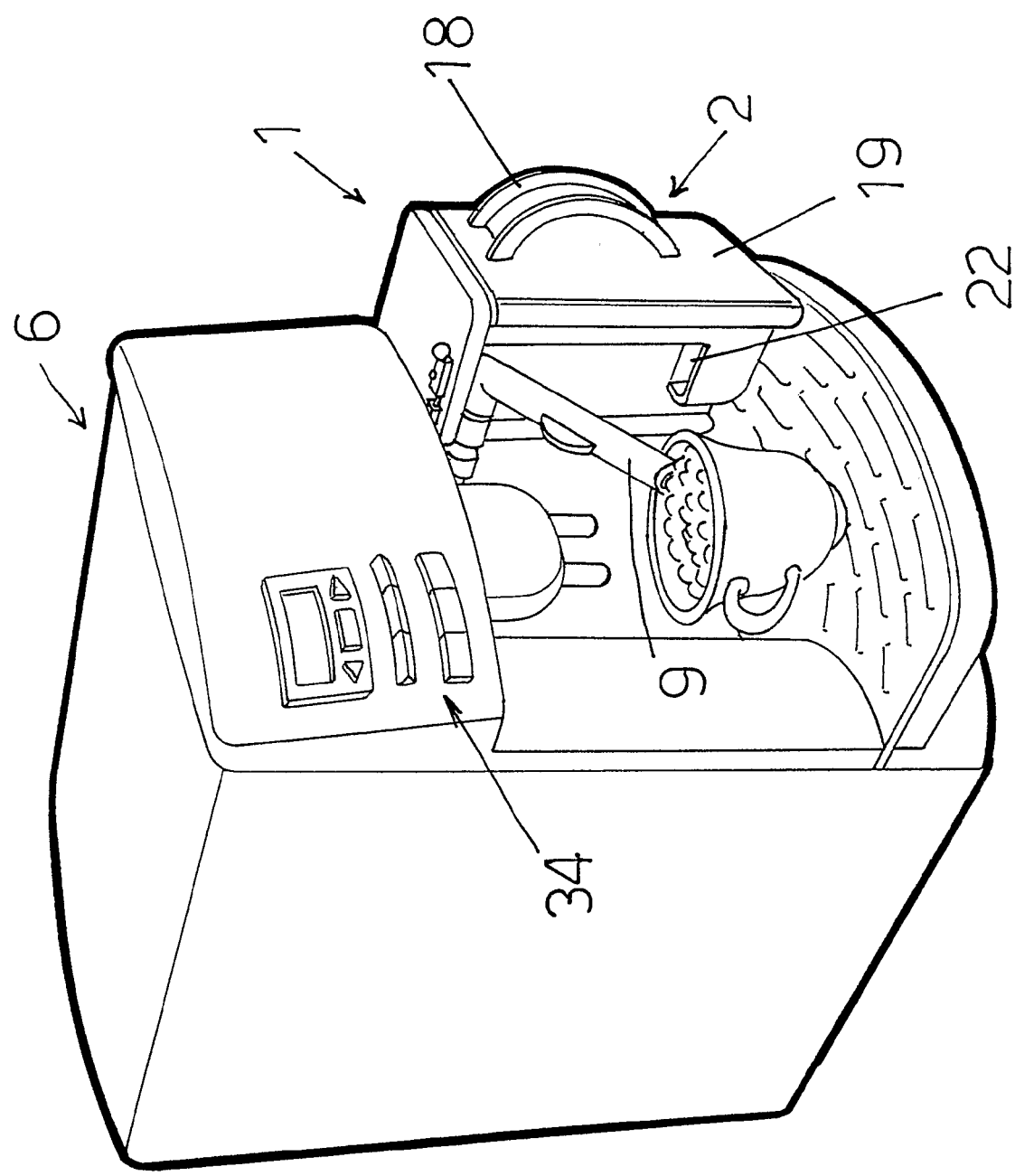
FIG. 5 is a perspective view of the device of FIG. 4 connected to the steam or hot-water dispenser of the coffee machine.
Figure 8:
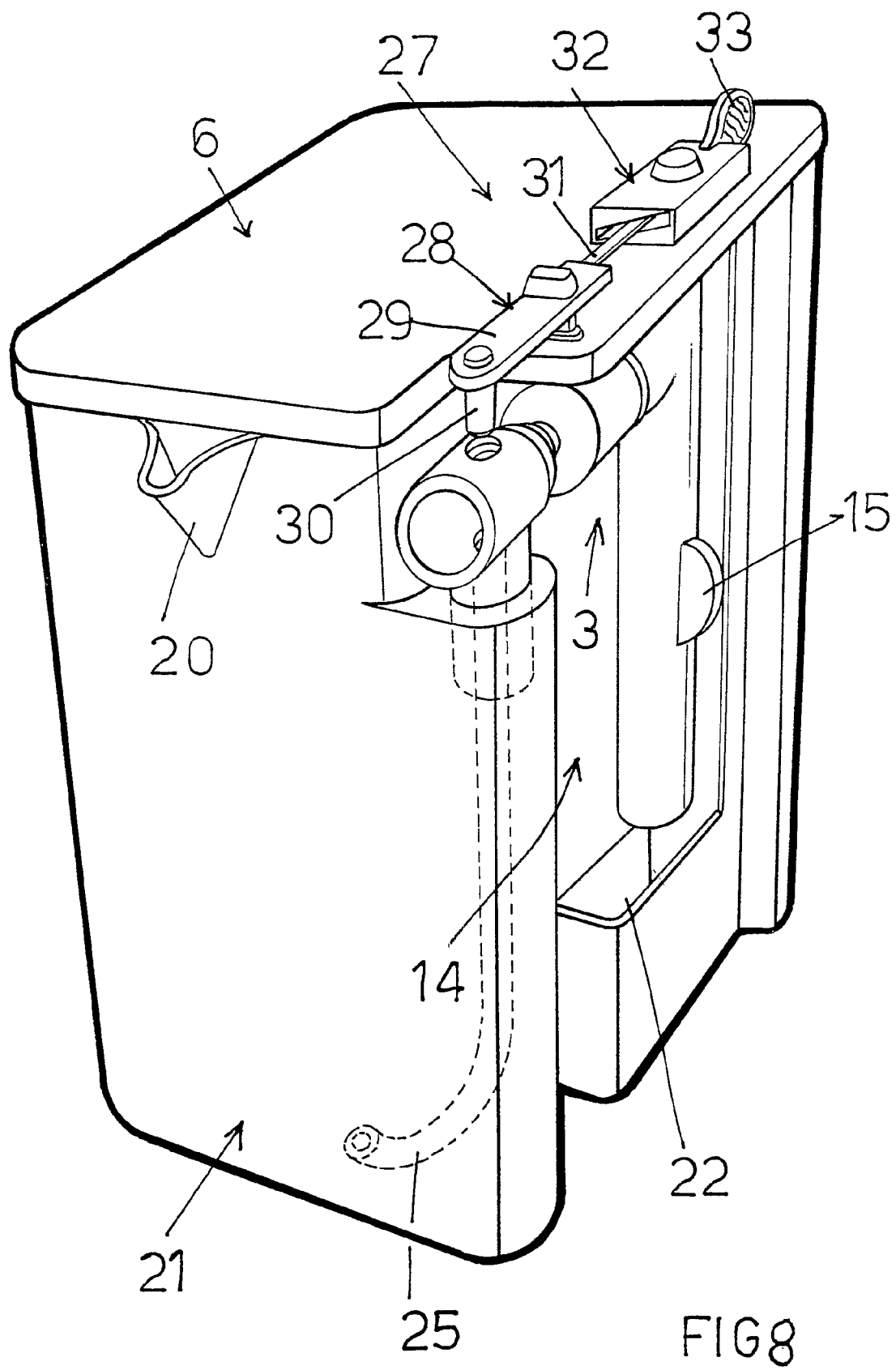
FIG. 8 is another perspective view of the device of FIG. 4.
Figure 9:
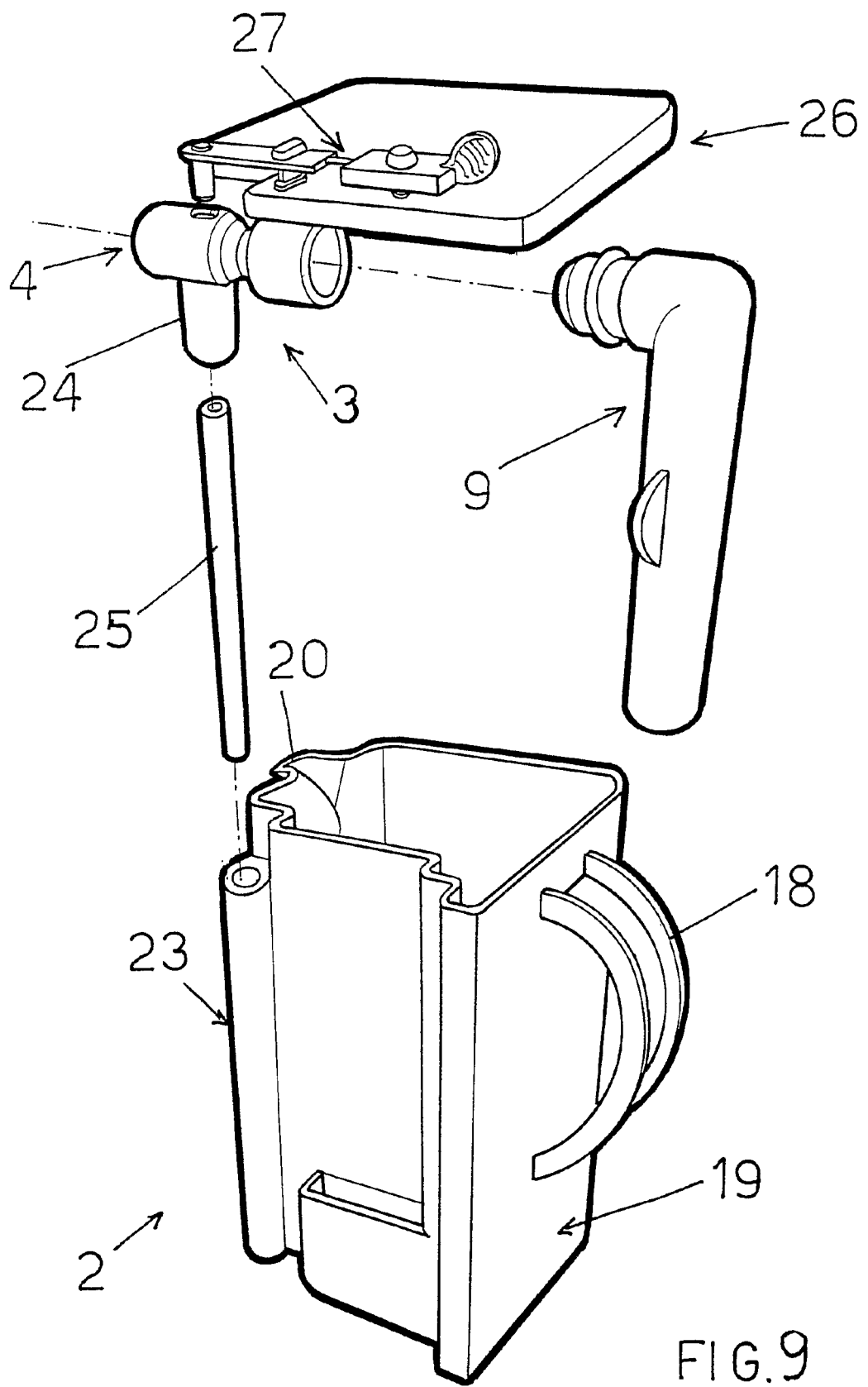
FIG. 9 shows the device of FIG. 4 disassembled into its constituent parts.
Figure 10:
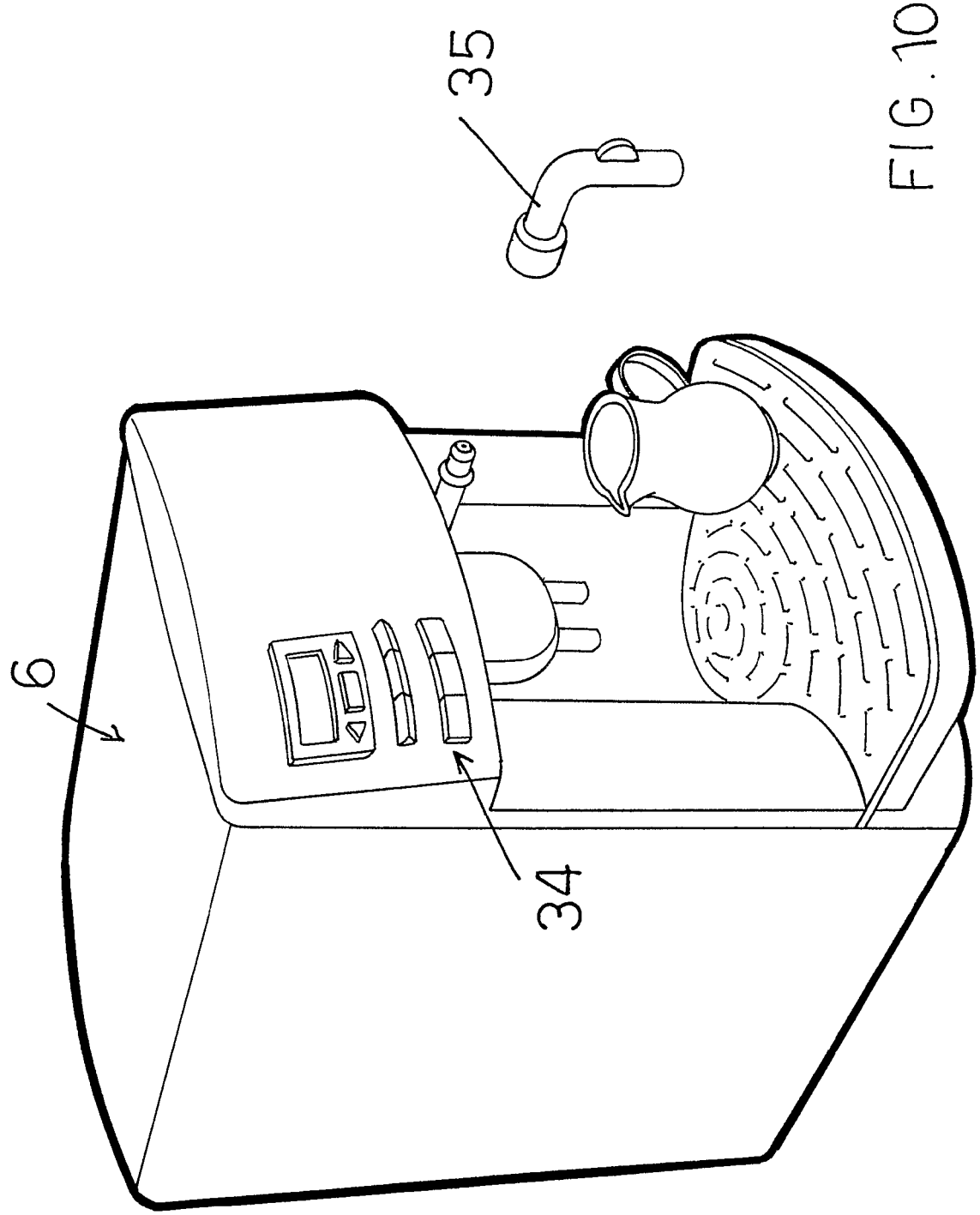
FIGS. 10 and 11 illustrate a coffee machine equipped with the original steam or hot-water dispensing nozzle for the conventional production of a steamed-milk drink or other drinks.
Figure 11:
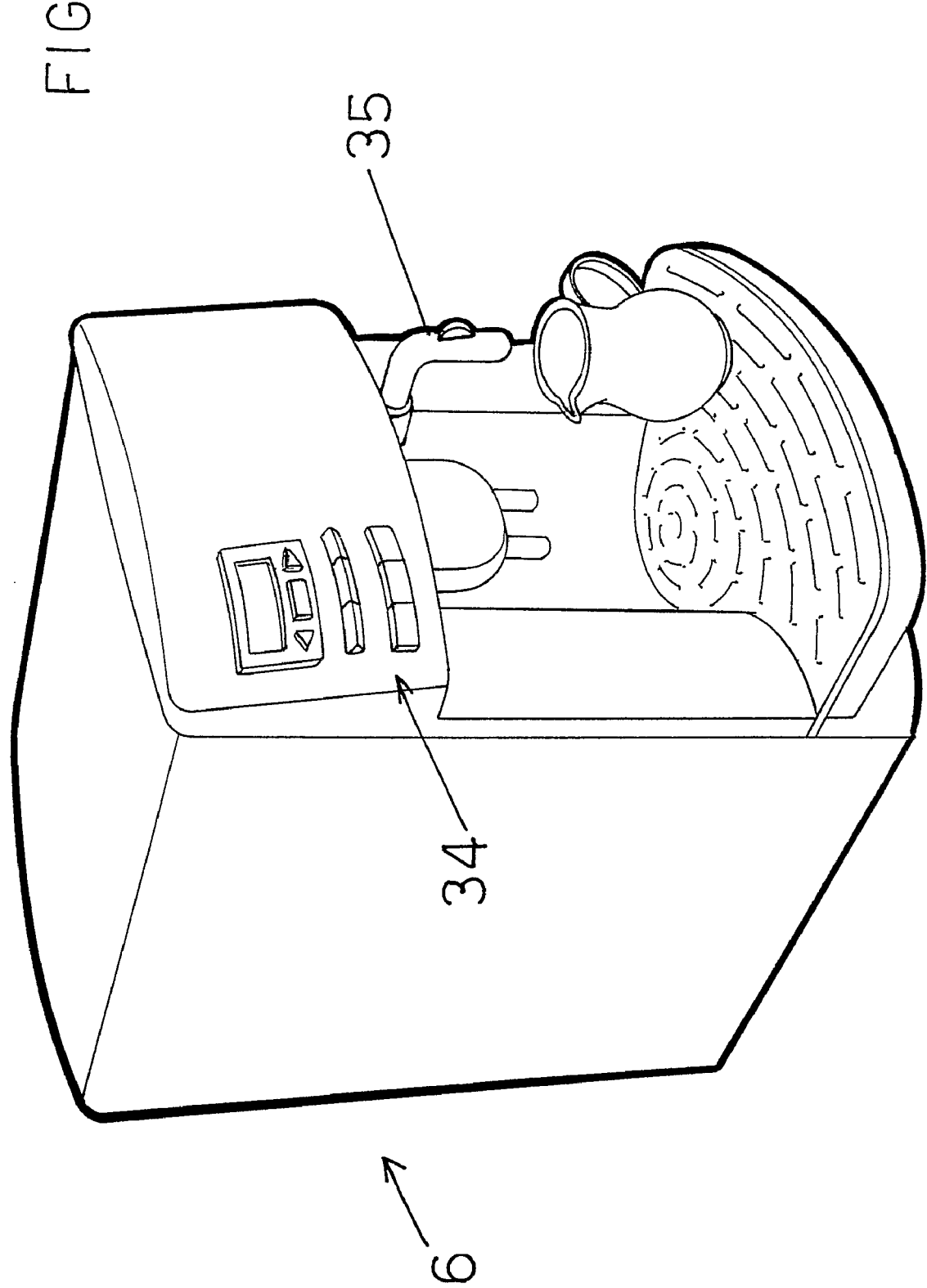

The collector body 3 also has an outlet 8 from the chamber 300, to which a discharge nozzle 9 can be removably fitted. The discharge nozzle 9 is rotatably connected to the outlet 8 of the collector body 3 and movable between a rest position (FIG. 8) adjacent to the first side wall 14 of the container 2 and a work position (FIG. 5) spaced from it. In particular, the discharge nozzle 9 has its rotation axis aligned with the dispenser 5. The discharge nozzle 9 also has a manual grip 15 for moving it from the rest position to the work position and vice-versa.

The container 2 has a substantially quadrangular shape in plan, with a grip 18 at a second side wall 19 perpendicular to the axial extension of the steam or hot-water dispenser 5, and a spout 20 formed in a third side wall 21 of the container 2 opposite the side wall 19. The pouring spout 20 is suitable for pouring the milk when the device 1 is not connected to the coffee machine 6.

Advantageously, indeed, the container 2 can also be used independently to conserve milk in the refrigerator so as to make cold milk immediately available to the customer.

The container 2 has a pocket 22 formed outside the first side wall 14 of the container 2 and below the discharge nozzle 9 to collect possible leakage of drops of liquid when the discharge nozzle 9 is in the rest position.

The container 2 also has a substantially vertical supply passage 23 of the milk from the bottom of the container 2 to the suction conduit 7 of the collector body 3, also formed outside the first side wall 14 of the container 2. The suction conduit 7 has a portion connected with the milk supply passage 23.

Figure 6:
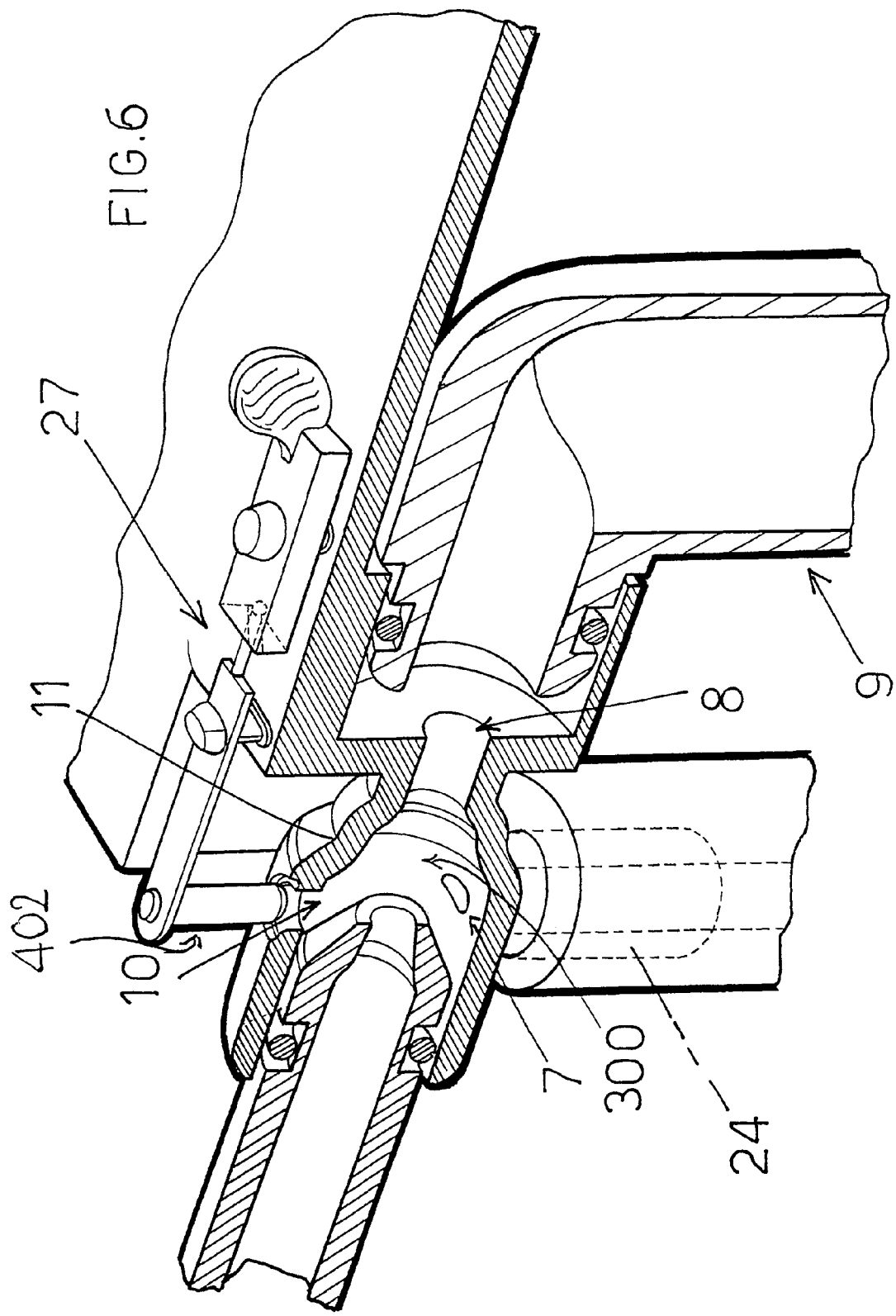
FIG. 6 is an axial section of the collector body of the device of FIG. 4.
Figure 7:
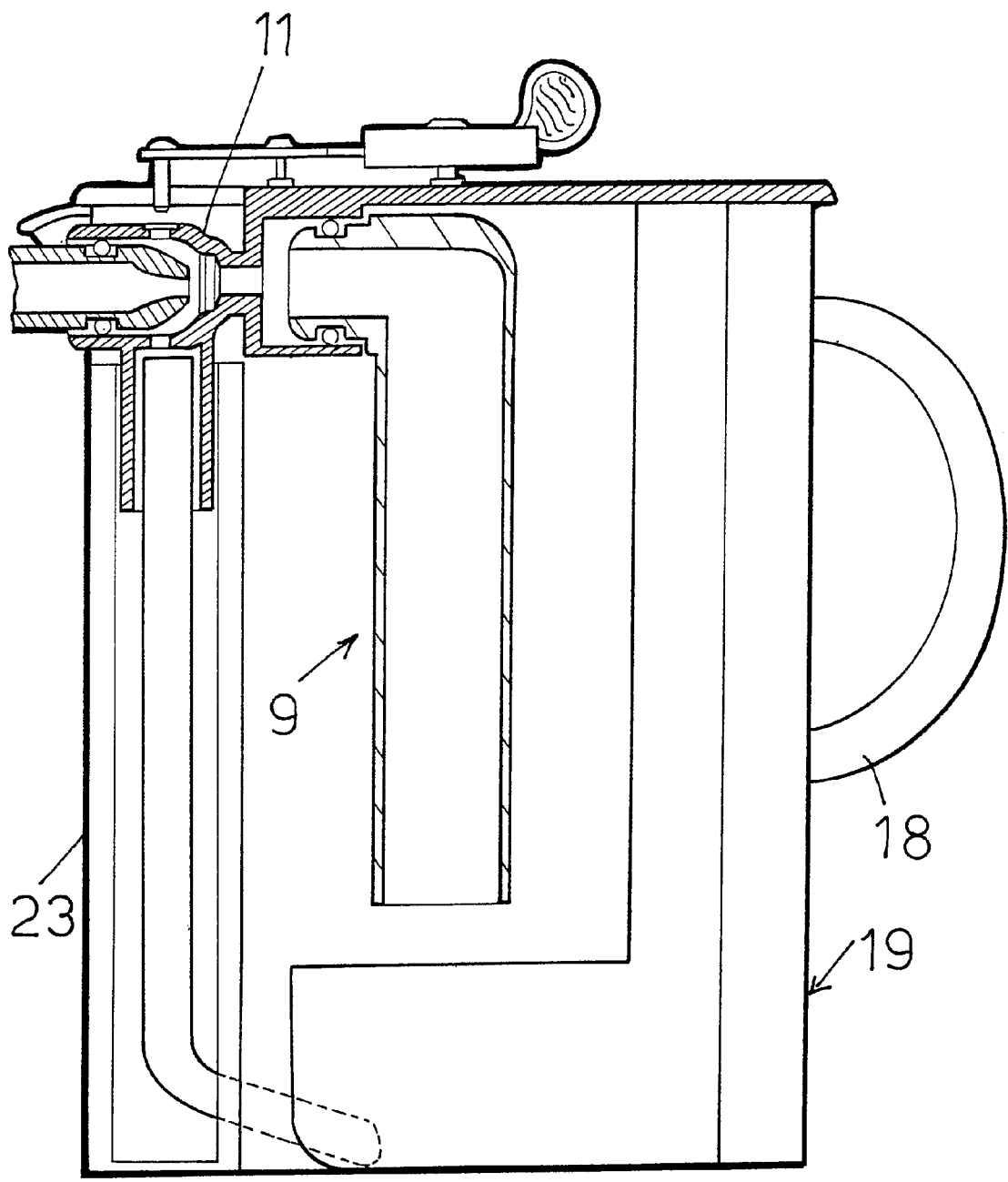
FIG. 7 is a side view partly in axial section of the collector body and milk container of the device of FIG. 4.

The device 1 also has a flexible tube 25 (FIG. 8) that extends axially inside the milk supply passage 23 and projects at one end toward the bottom of the container 2 and that fits at the other end inside a fitting 24 (FIG. 6) of the suction conduit 7. The collector body 3, the milk supply passage 23, the discharge nozzle 9 and the collection pocket 22 are in a chamber of the first side wall 14 of the container 2 to limit the overall bulk of the device 1.

The device 1 advantageously comprises at least first scraper 402 suitable for carrying out a cleaning scrape of the inner surface of the air suction conduit 10. Preferably, the device 1 also comprises second scraper 408 suitable for carrying out a cleaning scrape of the inner surface of the milk suction conduit 7, carried by the dispenser 5 so as to be actuated automatically during its introduction into and/or removal from the chamber 300. The second scraper 408 can comprise at least one protrusion 416 of the side surface of the dispenser 5. Finally, the device 1 can also comprise means 403 for adjusting the air flow rate through the air suction conduit 10, and possible manual control means 407 of the means 403 for adjusting the air flow rate.

For now we shall refer to the embodiments illustrated in FIGS. 1-3, 14 and 16.

The first scraper 402 are fixed rigidly (FIGS. 1-3 and 14) or operatively (FIG. 16) to the dispenser 5 so as to be actuated automatically during its introduction into and/or removal from the chamber 300.

In the first case the first scraper 402 in particular are formed integrally with the dispenser 5 (FIGS. 1-3 and 14).

The means 403 for adjusting the air flow rate, on the other hand, comprise a valve body 404 that can slide in the suction conduit 10.

The valve body 404 is fixed rigidly (FIGS. 1-3 and 14) or operatively (FIG. 16) to the dispenser 5.

In the first case the valve body 404 is formed integrally with the dispenser 5.

Between the side surface of the valve body 404 and the inner surface of the suction conduit 10 a gap 420 (FIG. 16) is defined that is sealed by a sealing element, in particular a toroidal ring 418, carried peripherally by the valve body 404.

The inner surface of the air suction conduit 10 also has at least one tapered or inclined discharge 405, which determines the air flow rate according to the position of the valve body 404.

Figure 2:
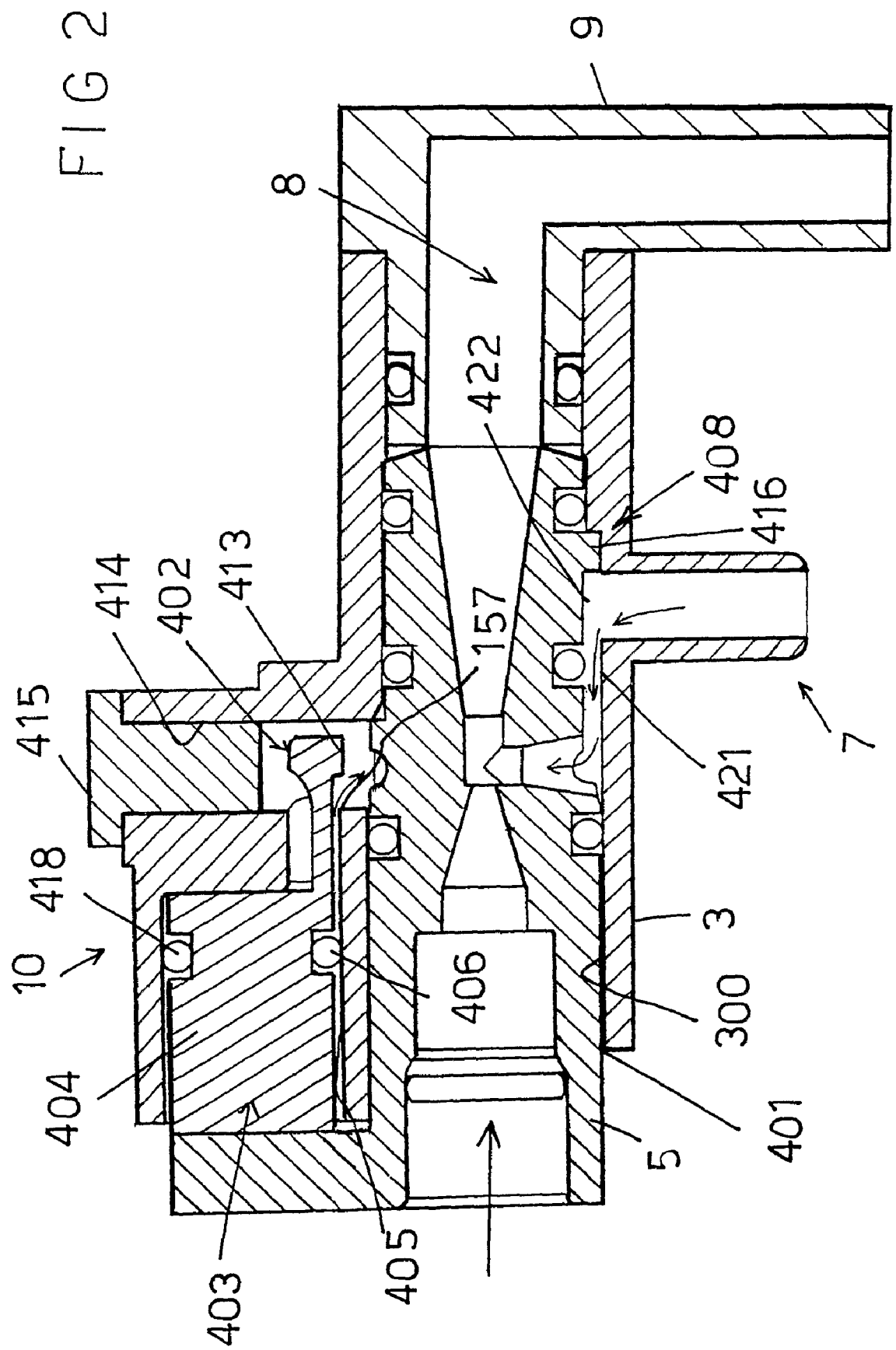
FIGS. 2 and 3 show possible variant embodiments of the dispensing passage of the steam/hot-water dispenser and/or of the chamber of the collector body into which it is introduced.
Figure 3:
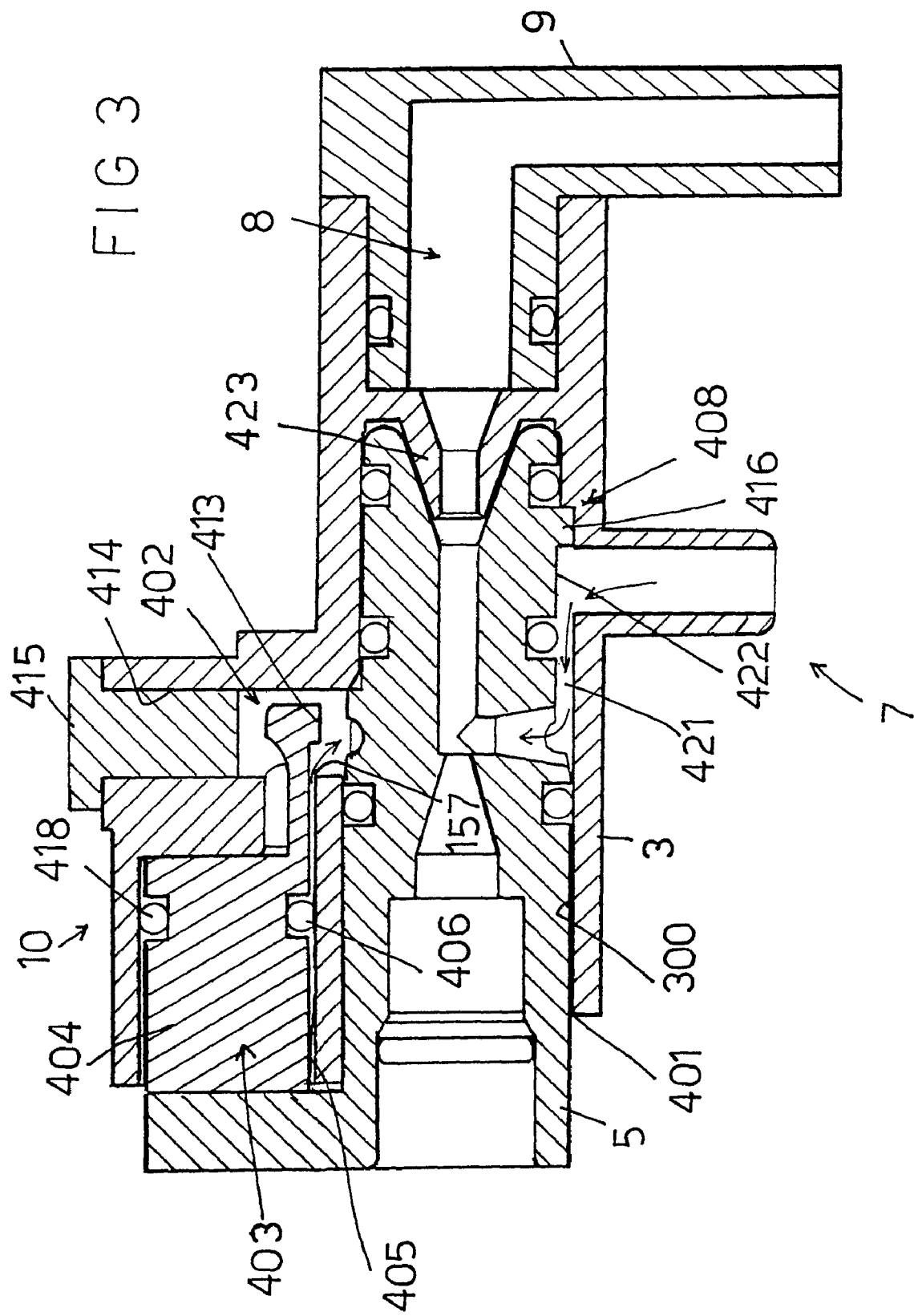
Figure 4:
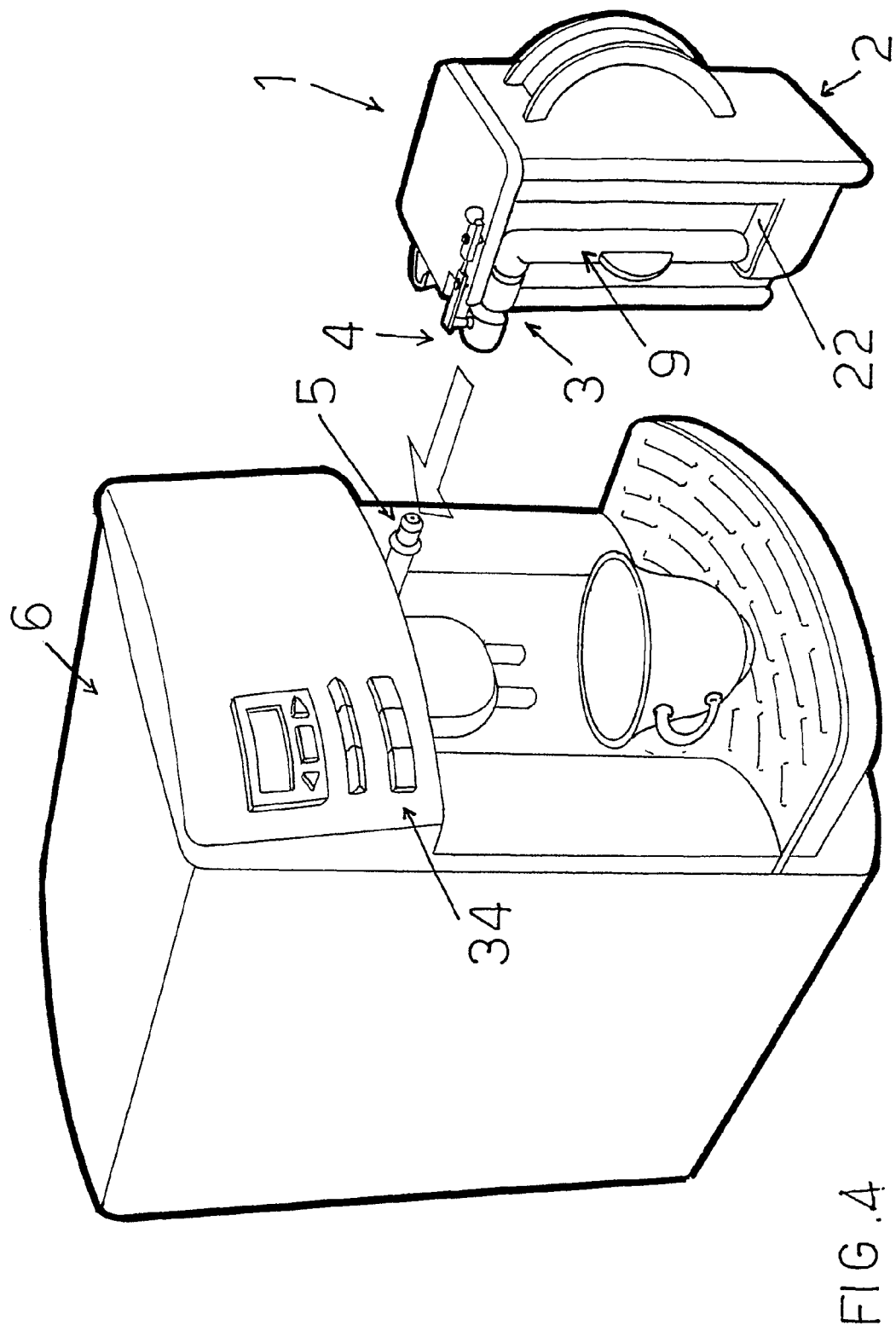
FIG. 4 is a perspective view of the device for producing a steamed-milk drink of the present invention removed from the steam or hot-water dispenser of the coffee machine.

In FIGS. 1-3 the discharge 405 has an interruption 406 so that when the sealing element 418 is at the interruption 406 the passage of air is totally blocked, whereas when the sealing element 418 is misaligned with the interruption 406 the air flow (indicated by an arrow) is allowed through the discharge 405 and the gap 420.

The first scraper preferably comprise an elastically yielding scraping tooth 413, in particular supported cantilevered by the valve body 404.

The scraping tooth 413 deforms elastically against the surface of the discharge 405 during introduction of the dispenser 5, lifting up, until, disengaging from the end part 157 of the discharge 405, it lowers back down with a snap movement intended to release the accumulated elastic deformation and it positions itself along a line of interference with the end 157 of the discharge 405.

The scraping tooth 413 with its angled base, moves automatically with respect to the line of interference with the end 157 of the discharge 405 to allow the disconnection of the dispenser 5 from the collector body 3.

For molding purposes there is an opening 414 of the wall of the air suction conduit 10, closed by a cap 415.

The control means 407 (FIG. 16) comprise an actuating member 311 suitable for moving the valve body 404 in opposition to the action of an elastic element 316, for example a spring between the valve body 404 and the dispenser 5.

The actuating member 311 is, for example, an adjustment screw engaged in a threaded seat 312 formed through a projection 313 of the collector body 3, the free end 314 of the screw 311 acting on an abutment 315 extending from the valve body 404 opposite to the action of the spring 316. The valve body 404 has a tailpiece 411 slidably guided parallel to the main axis of the collector body 3 along a guide 317 integral, and in particular formed in a single piece, with the dispenser 5. Turning the screw 311 causes the abutment 315 and the valve body 404 to move forward or backward and consequently the port for the passage of the air flow to be adjusted.

Of course, the adjustment system can have, instead of the adjustment screw 311, an eccentric or a cam that is able to move the abutment 315.

In FIGS. 1-3 and 16 the dispenser 5 defines a pre-mixing chamber 311 of the flows coming from the conduits 7 and 10, and the pre-mixing chamber 311 in turn communicates through a preferably tapered transverse passage 301 of the dispenser 5 with the dispensing passage 303 of the dispenser 5. Part of the pre-mixing chamber 301 can be formed by an annular groove in the side surface of the dispenser 5.

In FIG. 14, in the other hand, the flows from the conduits 7 and 10 and from the dispenser 5 mix into a single solution in a mixing chamber defined by the free portion of the chamber 300 defined by the dispenser 5.

In FIGS. 1-3, so that the second scraper 408 can operate, the milk suction conduit 7 is not aligned from the transverse passage 302 of the dispenser 5 and therefore a connection passage 421 is provided that is defined by a side hollow 422 of the dispenser 5, whereas in FIG. 16, since the second scraper 408 are not provided, the milk suction conduit 7 and the transverse passage 302 of the dispenser 5 are aligned and directly communicate.

The passage of the dispenser 5 must optimize the emulsion and at the same time be easy to inspect and clean. Many shapes are proposed the achieve this objective, and in particular in FIGS. 1 and 14 the passage of the dispenser is straight, in FIG. 2 it is flared, and in FIG. 3 it has an initial straight part and a flared end part in which a reducer 423 is inserted formed integrally from the collector body 3.

We shall now refer, in particular, to FIGS. 4-9. Amongst other things, they show a different embodiment of the first scraper.

In particular, the conduit 4 and the discharge conduit 8 are aligned on the main axis of the collector body 3, whereas the milk inlet conduit 7 and the air inlet conduit 10 are transverse to the main axis of the collector body 3 and diametrically opposite. Like in FIG. 14, the flows from the conduits 7 and 10 and from the dispenser 5 mix into a single solution in the mixing chamber defined by the free portion of the chamber 300 defined by the dispenser 5.

In this case, then, the chamber 300 has a convergent portion 11 suitable for creating a Venturi effect that sucks up milk from the container 2 when it is crossed by the flow of steam.

The scraper for cleaning the inner surface of the conduit 10 are advantageously actuated by a manually controlled lever assembly 27 pivoted directly on the cover 26. The lever assembly 27 comprises a lever 28 that can be operated perpendicular to the plane of the cover 26 and having a first lever arm 29 carrying a scraping finger 30 of the third conduit 10 and a second lever arm 31 arranged in a guide pivoted on the cover 26 and rotatable parallel to the plane of the cover 26.

The guide 32 (FIG. 8) has a guide plane that is inclined with respect to the plane of the cover 26 so that rotation in one direction and in the opposite direction lowers and raises the first lever arm 31 and consequently pulls the scraping finger 30 and pushes it into the conduit 10. Control of the lever assembly 27 is carried out manually through an ear 33 integral with the guide 32.

Figure 12:
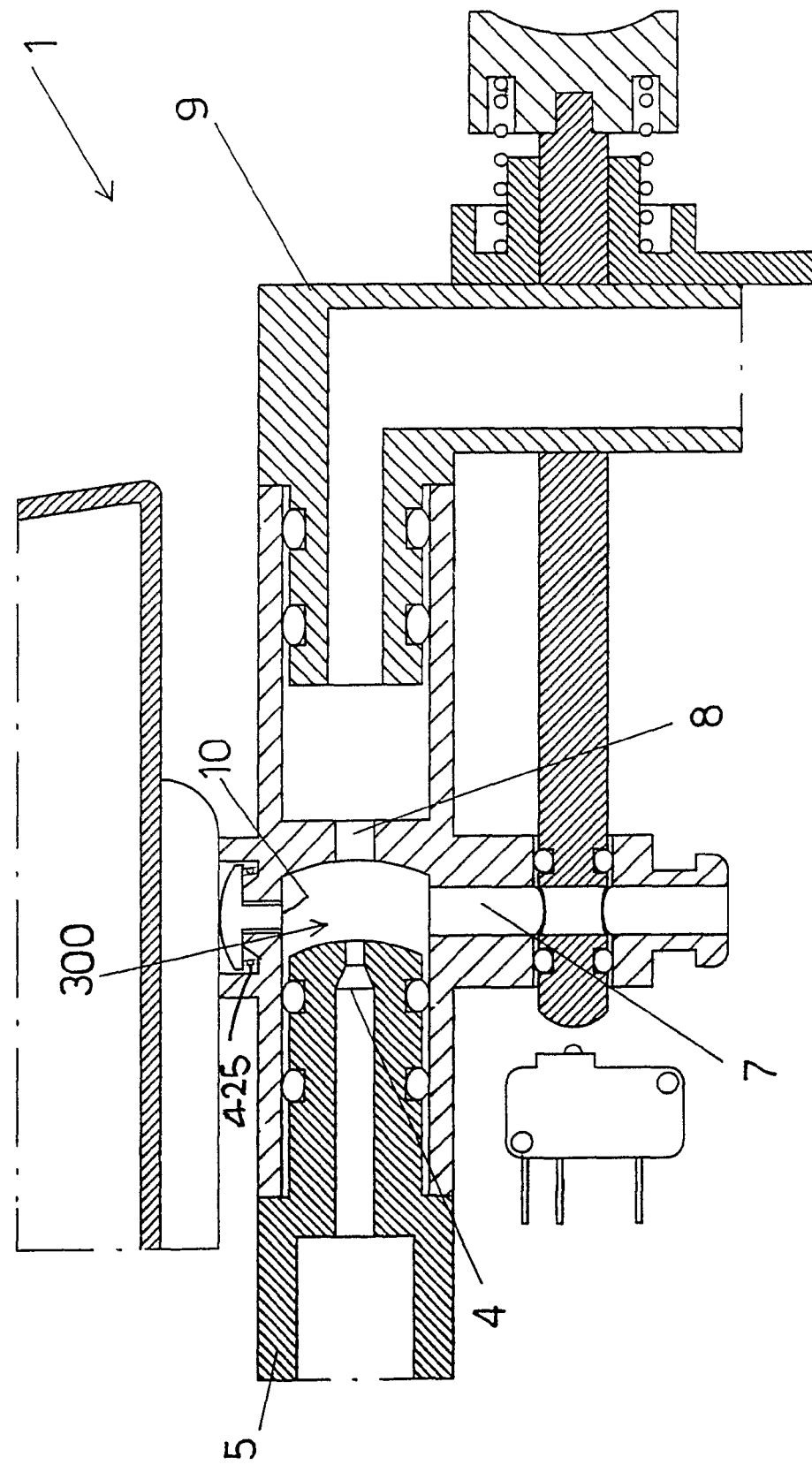
FIGS. 12 and 13, respectively, illustrate a section of an internal cleaning system of the collector body and of the nozzle of a device for producing a steamed-milk drink according to the present invention, in rest and in operating position, respectively.
Figure 13:
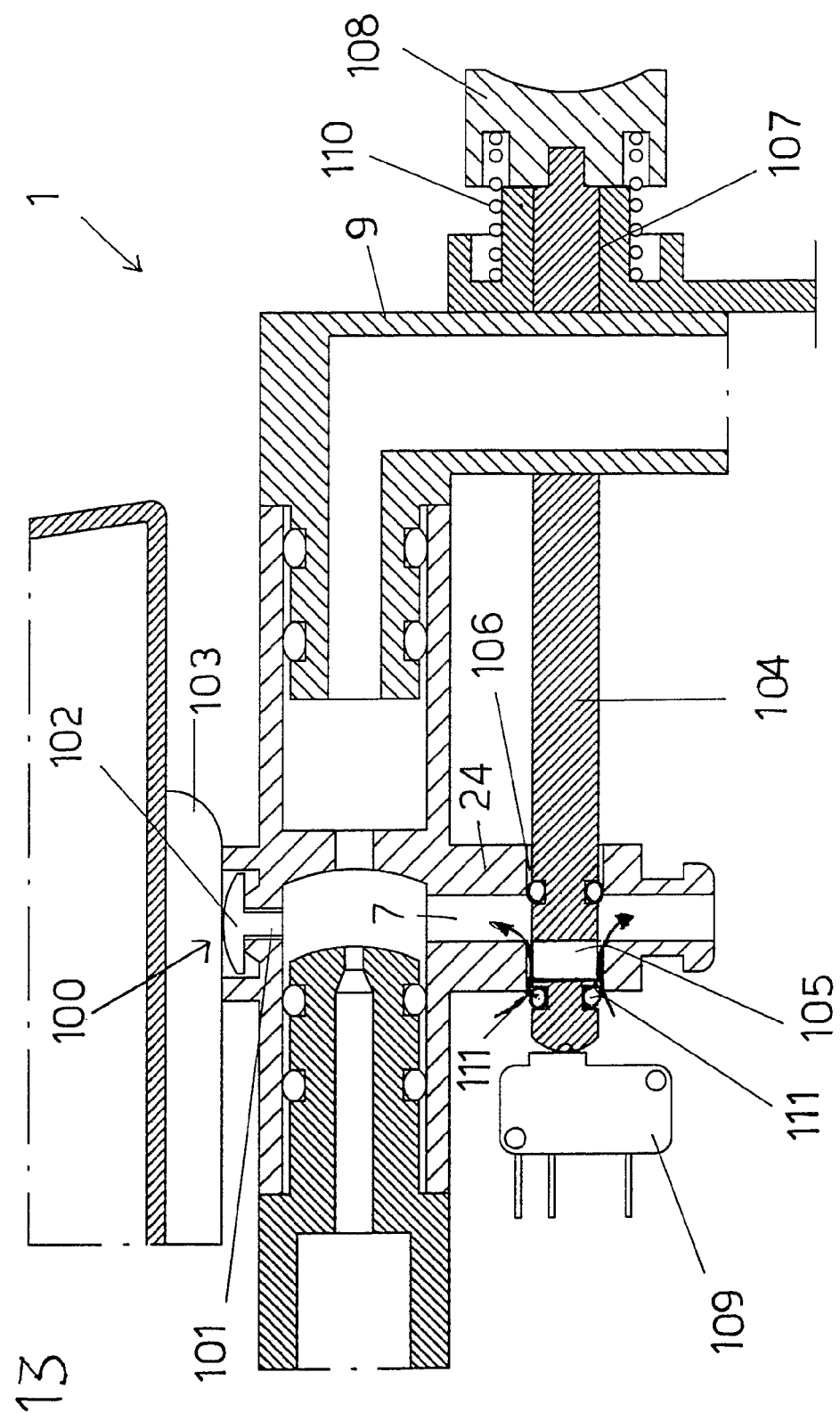

We shall now refer, in particular, to FIGS. 12 and 13.

The first scraper in this case comprises a scraping finger 101 that can slide in the conduit 10 and that has a widened head 102 against which a spring 425 acts that keeps it partially raised. When the collector body 3 is connected with the dispenser 5, a cam 103 integral with the casing of the coffee machine 6 acts upon the widened head 102, in contrast to the spring, to actuate the scraping finger 101.

Of course, the air passes through a gap between the scraping finger 101 and the inner surface of the conduit 10.

In FIGS. 12 and 13 an internal cleaning system of the collector body 3 and of the discharge nozzle 9 is also illustrated. Such a cleaning system comprises a microswitch 109 suitable for generating a signal indicating no flow of steam through the dispenser 5.

The cleaning system also has a shaft-shaped actuator 104 of the microswitch 109 transversely intersecting the conduit 7 and having a first transverse through hole 105 aligned with the passage of the conduit 7 when the actuator 104 is in a first operating position of disengagement from the microswitch 109, and not aligned with it when the actuator 104 is in a second operating position of engagement with the microswitch 109.

Preferably, the actuator 104 has gaskets 11 flanking the first hole 105 suitable for forming a seal, when the shaft 104 is in the first operating position, with the side wall of a second transverse through hole 106 of the conduit 7 through which the shaft 104 is arranged.

The actuator 104 is slidably supported by a guide 107 integral with the body of the container 2 and carries, at the end opposite to the one that can be engaged with the microswitch 109, a button 108 that can be actuated manually against the force of a spring 110 between the guide 107 and the button 108 itself. Basically, when the button 108 is not pressed, the actuator 104 remains in the first operating position and the opening 105 is aligned with the conduit 7 to allow the passage of milk.

On the other hand, when and all the time that the button 108 is pressed, the actuator 104 goes to the second operating position in which it simultaneously engages the microswitch 109 to generate the signal of no flow of steam and the opening 105 is completely misaligned with the conduit 7 to prevent the passage of milk.

Steam flows through the collector body 3 creating a subatmospheric pressure that sucks air both from the conduit 7 and from the third conduit 10, and arrives at the nozzle 9 from which it is finally expelled. In particular, this subatmospheric pressure causes the cleaning of the conduit 7 from possible milk residues and at the same time allows the milk to go back down (arrows FIG. 13) into the container.

In a possible variant to carry out the complete cleaning of the conduit 7, the nozzle 9 in the rest position engages with a sealing gasket (not shown) that seals its free end and prevents steam from coming out. In this case the pressurized steam discharges through the conduit 7 when the button 108 is released.

In FIGS. 17 and 18 an automatic locking system is illustrated, suitable for locking the container in position between the collector body 3 and the dispenser 5.

The locking system has a first manual control lever 321 operatively supported at 322 by the container 2 and a second lever 323 operatively supported at 324 by the container 2 and controlled by the first control lever 321 between an attached position and a detached position from an engagement seat 325 formed in the casing 326 of the machine.

The device comprises a second microswitch 327 for switching the function of the machine, suitable for enabling the production of steam and, therefore, the cleaning system of the collector body 3 and of the nozzle 9 when the automatic locking system is operative and for preventing the production of steam when the automatic locking system is not operative. The second microswitch 327 is positioned in the seat 325 of the second lever 323 and is switched by the second lever 323 at the moment of engagement/disengagement in the seat 325.

In particular, when the collector body 3 of the container 2 is removed from the dispenser 5, the second microswitch 327 is deactivated and the steam-production function and, therefore the internal cleaning function of the collector body 3 and of the nozzle 9, are prevented.

When, on the other hand, the collector body 3 of the container 2 is connected to the dispenser 5, the second microswitch 327 is activated and the production of steam is enabled and operative.

The process for producing a cappuccino is briefly the following:

The coffee machine 6 has a keypad 34 having at least one button for controlling the production of cappuccino and buttons for activating the functions of steam and water production to be sent to the dispenser 5.

The device 1 is associated with the coffee machine by engaging the dispenser 5 into the inlet conduit 4, and then the button for activating the steam function is pressed. When the button that enables the production of a cappuccino is pressed, the control unit of the coffee machine automatically controls the preparation of a dose of brewed coffee in a cup positioned below the dispenser group of the coffee machine, the withdrawal of a predetermined amount of milk contained in the container 2 through the action of a steam flow sent by the dispenser 5 and the consequent controlled frothing of the milk through the effect of the air entering through the inlet conduit 10 of the collecting chamber 3, the interruption of the flow of steam when the predetermined amount of milk has been withdrawn, and the final conveying of the milk into the cup for mixing with the brewed coffee.

Clearly, it is possible to prepare the milk first and then the brewed coffee or vice-versa.

In the case in which its is wished to produce a coffee and steamed-milk drink without froth the same procedure described above is repeated actuating the means for adjusting the air flow so as to zero the air flow.

The coffee machine, through a suitable command, can also control the production of an exclusively frothed steamed-milk drink. In this case the same procedure described above is repeated eliminating the first step of producing a dose of brewed coffee in the cup.

After having removed the device 1 the dispenser 5 can once again have its nozzle 35 with which it was originally equipped connected. In this way, a cappuccino can be produced with the more conventional method, pressing the buttons for activating the steam production function, or else hot water can be produced for the preparation of a tea-based or other brew, pressing the buttons for activating hot-water production.

Now with reference to FIG. 15, a preferred embodiment of hot-water production circuit and of the steam-production circuit is illustrated, which are both supplied by an electrically powered pump 166 controlled by a flow controller 167 and suitable for withdrawing water from a reservoir 168.

The hot-water circuit comprises a first boiler 158 (suitable for producing hot water) connected through a first valve (not shown) to the brewing chamber of the coffee machine.

The steam circuit extends from the first boiler 158 through a second electrically powered valve 159 having three ports 160, 161 and 162 that puts the first boiler 158 in communication with a discharge line 163 and with a second boiler 164 for producing steam in turn connected to the steam dispenser 5 through a third electrical valve 165.

To produce a cappuccino, when the operator gives a single command, first of all the water circuit for the preparation of brewed coffee is activated.

In this step the first valve is open, whereas the second and third valves 159 and 165 remain closed and the pump 166 is actuated until the flow controller 167 has dosed into the first boiler 158 a predetermined volume of water to make the brewed coffee.

Then the steam circuit for frothing the milk is activated. In this step the first valve closes whereas the second valve 159 connects the ports 160 and 161 and keeps the conduit 162 of the discharge line 163 closed, the third valve 165 opens, and the pump 166 is actuated until the flow controller 167 has measured the passage into the second boiler 164 of a predetermined volume of water to make the steam necessary to froth the milk.

Finally, there follows a discharge step of the pressure of the steam, in which the second valve 159 keeps the port 161 open, closes the port 160 and opens the port 162 to the steam discharge conduit 163.

Preferably, to limit the consumption of electrical energy the first and second boiler are selectively activated, possibly intermittently, and thus the water destined for the second boiler is not necessarily preheated in the first boiler.

Moreover, when the second boiler is activated the opening of the valve 165 is delayed with respect to the starting of the pump 166 so as to generate pressurized steam.

The device for producing a steamed-milk drink thus conceived can undergo numerous modifications and variants, all of which are covered by the inventive concept; moreover, all of the details can be replaced with technically equivalent elements. In practice, the materials used, as well as the sizes, can be whatever according to the requirements and the state of the art.

The invention claimed is:

1. A coffee machine comprising:
   a housing;
   a dispenser head on the housing for pouring brewed coffee into a cup in a zone below the dispenser head;
   a horizontally open steam/hot-water dispenser fixed on the housing adjacent the dispenser head;
   a container adapted to hold a supply of milk and having a cover;
   a collector body forming on the cover a collecting to chamber;
   a connection conduit opening into the chamber, fixed to the cover, and fittable with the steam/hot-water dispenser to receive steam or hot water therefrom;
   an air-suction conduit fixed to the cover and opening into the chamber;
   a milk-suction conduit fixed to the cover and extending from the chamber down into the milk in the container, the connection, air-suction, and milk-suction conduits all opening into the chamber such that the air or the hot-water introduced into the chamber from the steam/hot-water dispenser can draw the air or the milk into the chamber; and a discharge conduit carried on the container and opening into the chamber and shiftable into a working position directed into the zone to feed a mixture of the steam or the hot water and the air and/or the milk into the cup below the dispenser head, the container with the cover, the collecting chamber, the connection conduit, the air-suction conduit, and the milk-suction conduit being separable together with the container and the cover from the steam/hot-water dispenser and the housing.

2. The coffee machine according to claim 1 wherein the discharge conduit is removably connected to the collector body.

3. The coffee machine according to claim 1 wherein the discharge conduit is rotatable between a rest position adjacent a side wall of the container and the working position in which the discharge conduit is spaced from the side wall of the container.

4. The coffee machine according to claim 1 wherein the discharge conduit has a rotation axis on an extension of a main axis of the collector body.

5. The coffee machine according to claim 3 wherein the container has a pocket formed outside of the side wall of the container and below the discharge conduit to collect possible leakages of drops of liquid when the discharge conduit is in the rest position.

6. The coffee machine according claim 1 wherein the container has a pour spout.

7. The coffee machine according to the claim 6, further comprising:
 means for producing the hot water;
 means for producing the steam; and
 means including a pump controlled by a flow meter for supplying the steam and the hot water to the steam/hot-water dispenser.

8. The coffee machine according to the claim 7 wherein the hot-water producing means comprises a first boiler and the steam producing means extends from the first boiler through a three-port valve that can connect the first boiler with a steam discharge line and with a second boiler for producing the steam and in turn connected to the steam/hot-water dispenser through a further valve.

9. The coffee machine according to the claim 8 wherein the first boiler and second boiler are selectively activated.

10. The coffee machine according to claim 8 wherein when the second boiler is activated the opening of the further valve is delayed with respect to the actuation of the pump to pressurize the steam produced.

11. The coffee machine according to claim 1 wherein the collector body has a discharge from the chamber to which the discharge conduit is removably fitted.

* * * * *